(12) United States Patent
Carcioffi

(10) Patent No.: US 6,561,573 B2
(45) Date of Patent: May 13, 2003

(54) VEHICLE BODY

(75) Inventor: Carlo Carcioffi, Maranello (IT)

(73) Assignee: Ferrari S.p.A., Modena (IT)

( * ) Notice: Subject to any disclaimer, the term of this patent is extended or adjusted under 35 U.S.C. 154(b) by 0 days.

(21) Appl. No.: 09/908,554

(22) Filed: Jul. 20, 2001

(65) Prior Publication Data

US 2002/0024237 A1 Feb. 28, 2002

(30) Foreign Application Priority Data

Jul. 21, 2000 (IT) .................................. BO2000A000448

(51) Int. Cl.⁷ .................................................. B60J 5/04
(52) U.S. Cl. .................. 296/202; 296/203.03; 296/188; 296/146.9
(58) Field of Search ................................ 296/188, 192, 296/193, 202, 203.03, 146.9

(56) References Cited

U.S. PATENT DOCUMENTS 5,382,071 A * 1/1995 Enning et al. ...... 296/203.03 X
5,385,383 A * 1/1995 Kreis et al. ............. 296/202 X
5,715,643 A * 2/1998 Parkinson .............. 296/203.03
6,116,680 A * 9/2000 Hunter et al. .......... 296/203.03
6,139,094 A * 10/2000 Teply et al. ........... 296/203.03
6,302,478 B1 * 10/2001 Jaekel et al. ........... 296/203.04

FOREIGN PATENT DOCUMENTS

DE   195 19 779 A   12/1995
EP   0 768 230 A   4/1997

* cited by examiner

Primary Examiner—D. Glenn Dayoan
Assistant Examiner—Jason Morrow
(74) Attorney, Agent, or Firm—Birch, Stewart, Kolasch & Birch, LLP

(57) ABSTRACT

A vehicle body having a floor panel and at least one post projecting from the floor panel; the body being characterized in that the post is defined by a box member having an inner cavity and formed in one piece by means of a casting process employing cores of sand or similar filler material.

8 Claims, 5 Drawing Sheets

VEHICLE BODY

The present invention relates to a vehicle body.

In particular, the present invention relates to an aluminum vehicle body, to which the following description refers purely by way of example.

BACKGROUND OF THE INVENTION

As is known, in recent years, there has been a marked increase in the number of vehicle models featuring aluminum bodies this tendency is due to the fact that, for a given structural strength, aluminum bodies are much lighter than conventional steel bodies and so provide for a drastic reduction in the overall weight of the vehicle and, hence, in fuel consumption and, more importantly, in polluting emissions by the vehicle.

The downside of all these advantages, however, is the extremely high production cost involved, which is why aluminum bodies are limited solely to higher-range vehicles.

As is known, all vehicle bodies, regardless of the material used, comprise a floor panel and a number of posts, to some of which the vehicle doors are hinged. In the case of aluminum bodies, the process employed to assemble the posts, particularly those to which the doors are hinged, is highly complex and expensive and accounts for a large part of the overall production cost of the body.

The post manufacturing process currently adopted by all car manufacturers, by reputedly being the best, is to produce the post in a number of parts, which are welded together prior to final assembly to the body. If the post is to support a door, the body of the post is bolted or welded with hinges to which the door is then fixed.

More specifically, in a first tested solution, each post comprises an extruded, constant-section, central tubular member; two butts welded to the two ends of the tubular member to connect the tubular member to the other body members; and a number of reinforcing members welded to the more severely mechanically stressed portions of the post.

For cost reasons, the above solution has been replaced over the past few years with one in which, as shown in FIG. 1, each post I is divided into two a complementary half-shells Ia and Ib, one cast and the other pressed, which are welded and/or riveted together, with the resulting whole welded or riveted, if necessary, with the door hinges.

Both the first and second solution have the major drawback of involving a good deal of welding, which, in the case of aluminum, must be performed in an inert atmosphere at considerable cost. Moreover, the presence of a large number of welds on a part increases the likelihood of fatigue failure, so that manufacturers are forced to use materials of a thickness well in excess of the minimum thickness theoretically required.

SUMMARY OF THE INVENTION

It is an object of the present invention to provide an aluminium vehicle body which, as compared with known types, is cheaper to produce and provides for greater structural strength.

According to the present invention, there is provided a vehicle body comprising a floor panel and at least one post projecting from said floor panel; the body being characterized in that said post is defined by a box member having an inner cavity and formed in one piece using a casting process.

BRIEF DESCRIPTION OF THE DRAWINGS

A non-limiting embodiment of the present invention will be described by way of example with reference to the accompanying drawings, wherein.

DETAILED DESCRIPTION OF THE INVENTION

Figure 1:
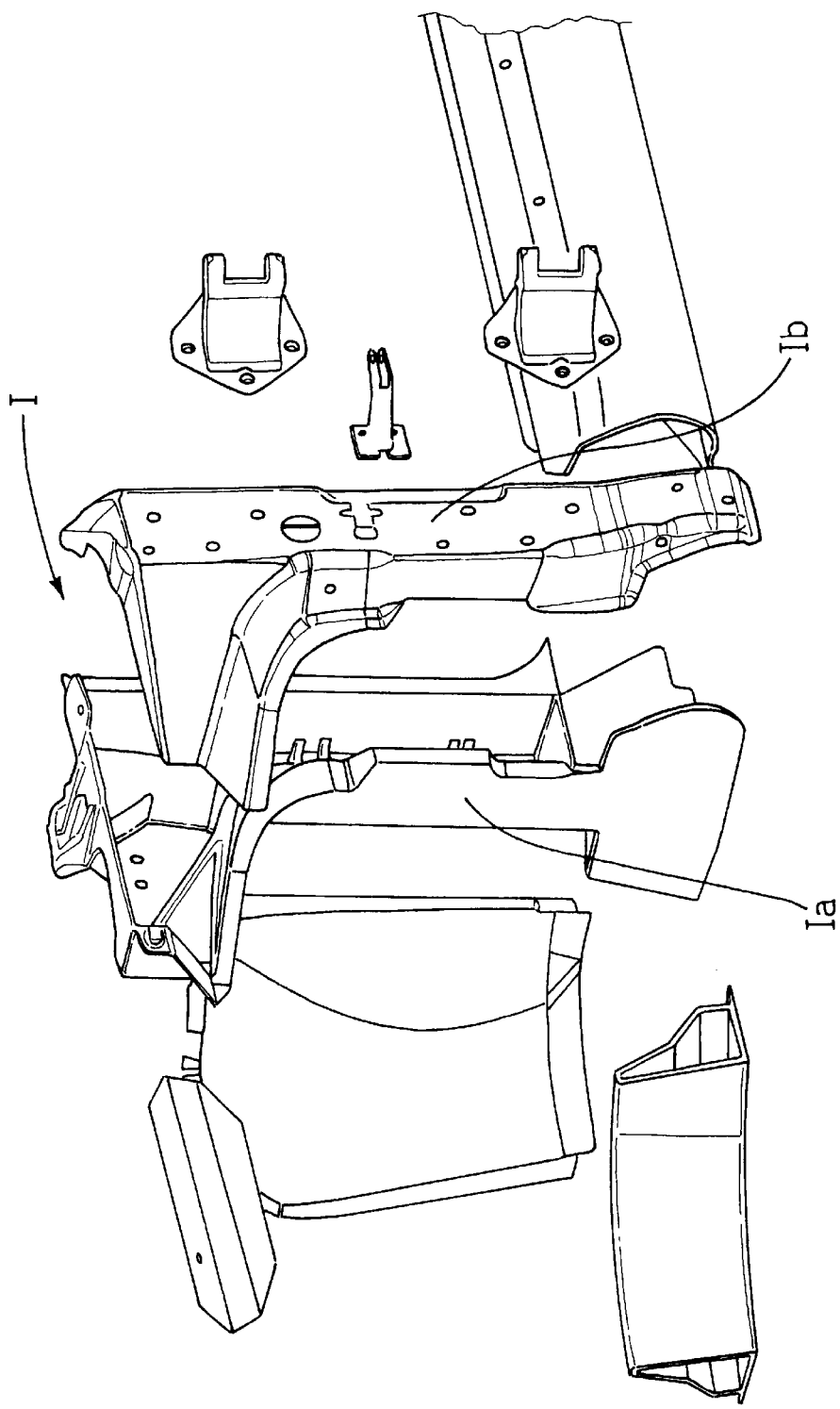
FIG. 1 shows a portion of vehicle body representing the prior art.
Figure 2:
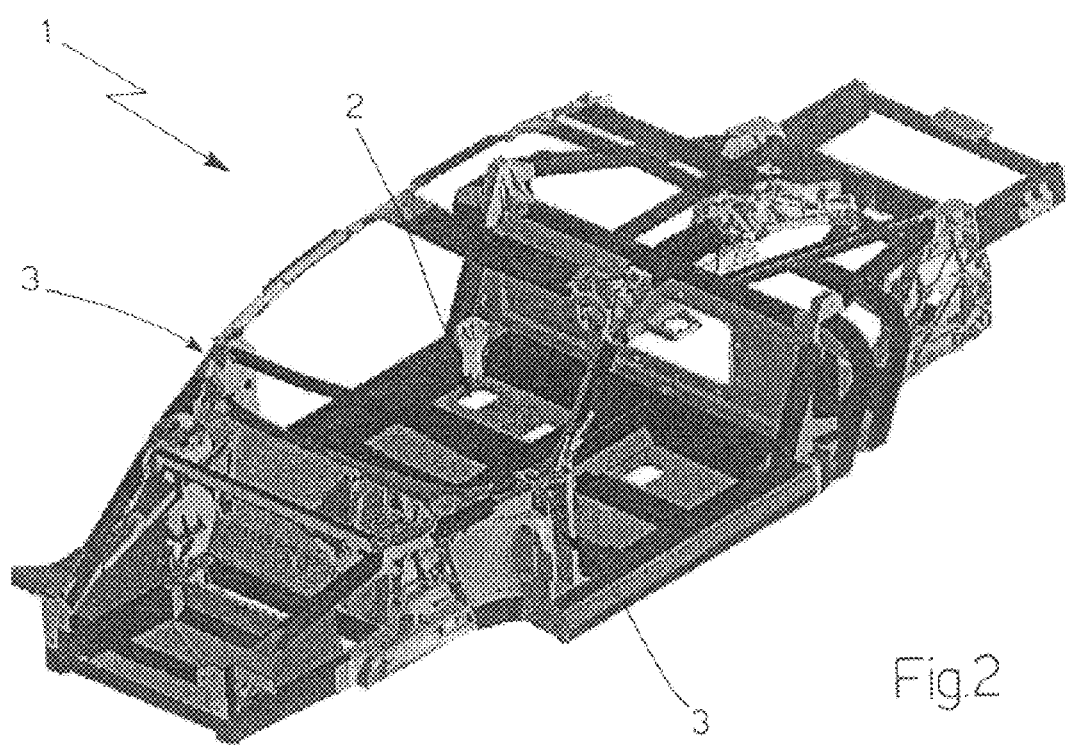
FIG. 2 shows a view in perspective, with parts removed for clarity, of a vehicle body in accordance with the teachings of the present invention.
Figure 3:
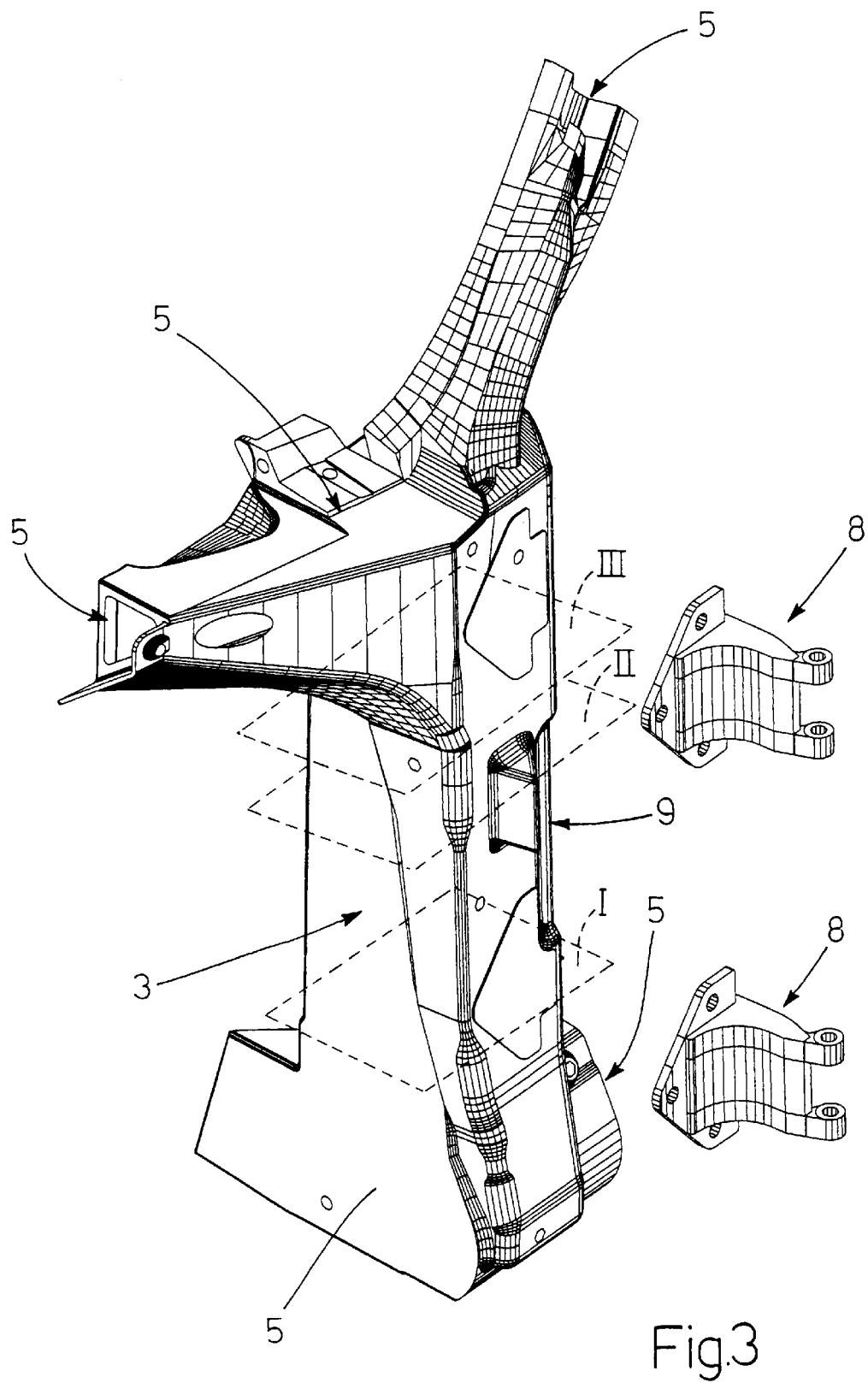
FIG. 3 shows a view in perspective, with parts removed for clarity, of one of the posts of the FIG. 2 vehicle body.
Figure 6:
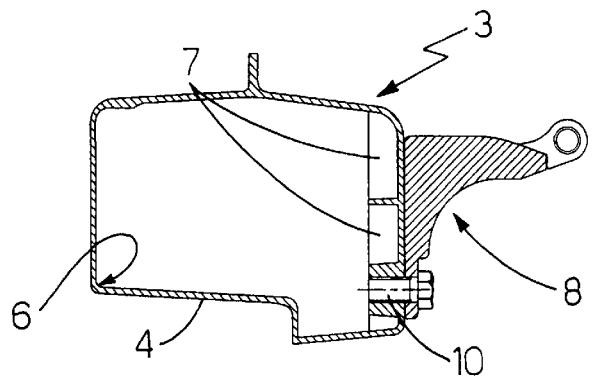
FIGS. 4, 5 and 6 show three sections of the FIG. 3 post in planes I, II and III respectively.
Figure 5:
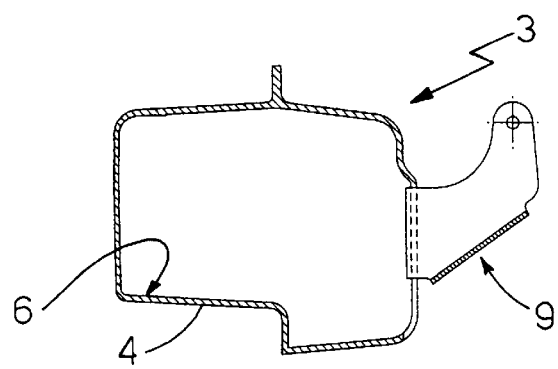
Figure 4:
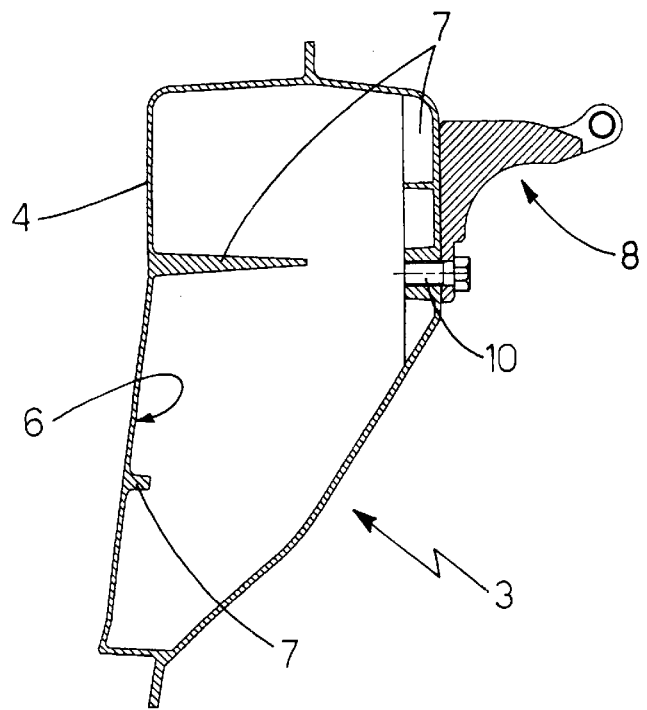

Number 1 in FIG. 2 indicates as a whole a vehicle body preferably, though not necessarily, made of aluminum or aluminum alloy, and comprising a floor panel 2, and a number of posts 3 projecting from floor panel 2.

With reference to FIGS. 3, 4, 5 and 6, at least one of posts 3 of body 1 is defined by a hollow box member 4 formed in one piece by means of a casting process employing cores of sand or similar filler material.

Externally, box member 4 has a number of interfacing appendixes 5 by which it is connected to the other adjoining members of body 1.

Inside its cavity 6, box member 4 has one or more reinforcing ribs 7, which are formed in one piece with the rest of box member 4, provide for locally increasing the resisting section of the post, and are located at the more severely mechanically stressed portions.

Post 3 preferably, though not necessarily, also comprises one or more hinges 8 and a door-stop tie anchoring bracket 9, to which the vehicle door (not shown) is fixed. In which case, reinforcing ribs 7 are also located inside cavity 6 of box member 4, at the fasteners of hinges 8 and door-stop tie anchoring bracket 9.

With reference to FIGS. 3, 4, 5 and 6, hinges 8 and bracket 9 are known types, and are fixed to box member 4 by bolts 10 or similar fastening systems, such as rivets or weld spots, after first machining the outer surface portions of box member 4 on which hinges 8 and bracket 9 rest.

Figure 9:
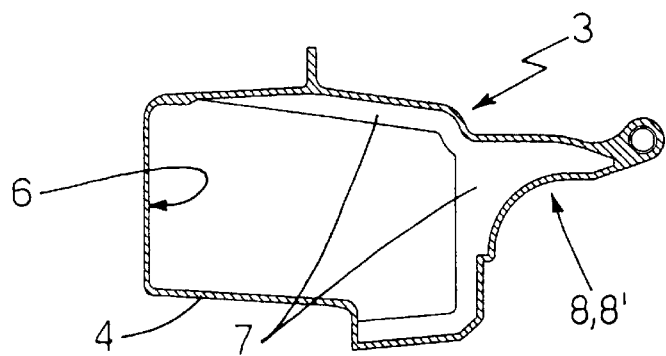
FIGS. 7, 8 and 9 show three sections of a further embodiment of the FIG. 3 post in planes I, II and III respectively.
Figure 8:
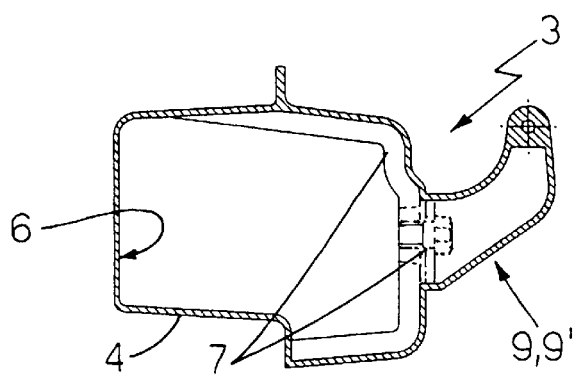
Figure 7:
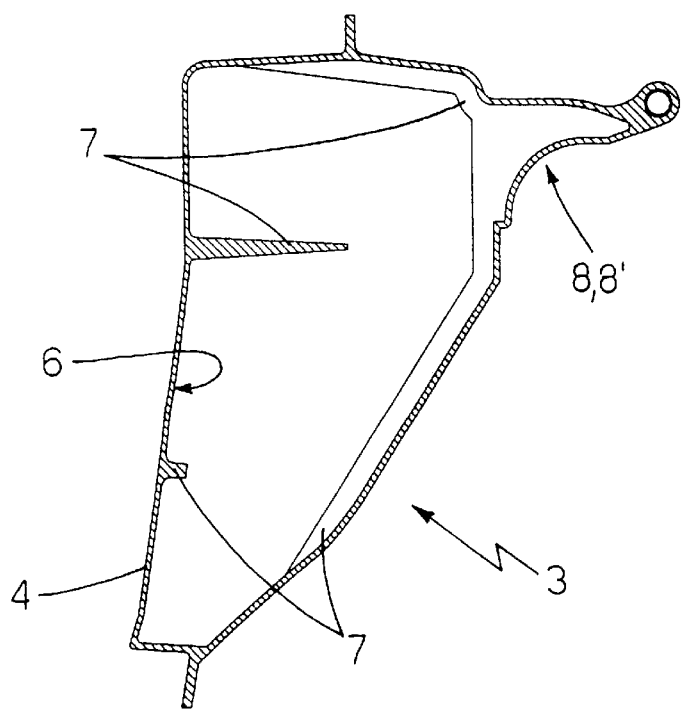

In the FIG. 7, 8 and 9 variation, hinges 8 and bracket 9 of post 3 are incorporated in the body of box member 4.

More specifically, hinges 8 and bracket 9 are formed in one piece with the rest of box member 4 during casting, by forming, on box member 4, appendixes 8' and 9', which are then machined to form hinges 8 and door-stop tie bracket 9.

Operation of body 1 is easily deduced from the foregoing description with no further explanation required.

The advantages of body 1 described and illustrated herein are obvious: posts 3 formed as described require no assembly work, thus drastically reducing production costs.

For a given weight, the box shape of post 3 and the absence of any welds increase the structural strength of the part and of body 1 as a whole, with obvious advantages in terms of passenger safety in the event of accidents.

Clearly, changes may be made to vehicle body 1 as described and illustrated herein without, however, departing from the scope of the present invention.

What is claimed is:

1. A vehicle body comprising a floor panel and at least one post member projecting from said floor panel and containing at least one hinge to which a vehicle door is to be fixed, wherein said post member is defined by a box member having an inner cavity which includes at least one reinforcing rib, said box member being formed in one piece using a casting process, said at least one reinforcing rib being formed in the inner cavity of said box member during said casting process, and wherein said at least one hinge is formed in one piece with the box member during said casting process.

2. The vehicle body as claimed in claim 1, wherein said box member includes a number of interfacing appendixes by which it is connected to the other adjoining members of the vehicle body.

3. The vehicle body as claimed in claim 1, wherein said post contains a door-stop tie anchoring bracket.

4. The vehicle body as claimed in claim 3, wherein said at least one reinforcing rib is located inside the inner cavity of the box member, at fasteners of said door-stop tie anchoring bracket.

5. The vehicle body as claimed in claim 3, wherein said door-stop tie anchoring bracket is fixed to the box member by bolts.

6. The vehicle body as claimed in claim 3, wherein said door-stop tie anchoring bracket is formed in one piece with the box member during casting.

7. The vehicle body as claimed in claim 1, made of aluminum alloy.

8. A vehicle comprising a vehicle body as claimed in claim 1.

* * * * *